Dec. 14, 1954  C. L. PETERSON ET AL  2,696,916
ROTARY FILTER REMOVABLE FROM CASING

Filed Aug. 18, 1947

INVENTORS.
C. LYNN PETERSON
CLARENCE J. PETERSON
& HENRY M. HUNTER
BY
ATTORNEY

FIG. 4

Dec. 14, 1954  C. L. PETERSON ET AL  2,696,916
ROTARY FILTER REMOVABLE FROM CASING
Filed Aug. 18, 1947  8 Sheets-Sheet 4

INVENTORS
C. LYNN PETERSON
CLARENCE J. PETERSON
& HENRY M. HUNTER

BY
ATTORNEY

Dec. 14, 1954          C. L. PETERSON ET AL          2,696,916
                 ROTARY FILTER REMOVABLE FROM CASING
Filed Aug. 18, 1947                              8 Sheets-Sheet 5

INVENTORS
C LYNN PETERSON
CLARENCE J. PETERSON
& HENRY M. HUNTER

BY
ATTORNEY

Dec. 14, 1954    C. L. PETERSON ET AL    2,696,916
ROTARY FILTER REMOVABLE FROM CASING
Filed Aug. 18, 1947    8 Sheets-Sheet 6

INVENTORS
C. LYNN PETERSON
CLARENCE J. PETERSON
& HENRY M. HUNTER

BY *H. A. McGrew*
ATTORNEY

United States Patent Office 2,696,916
Patented Dec. 14, 1954

2,696,916

ROTARY FILTER REMOVABLE FROM CASING

C. Lynn Peterson and Clarence J. Peterson, Salt Lake City, Utah, and Henry M. Hunter, Brooklyn, N. Y., assignors, by mesne assignments, to George D. Dickey and Henry M. Hunter Application August 18, 1947, Serial No. 769,198

6 Claims. (Cl. 210—200)

This invention relates to filtering apparatus, and particularly to a pressure filter, wherein the liquid and solid constituents of a pulp, normally consisting of finely divided solids carried by liquids, are separated by forcing the liquid through a filter medium, upon which the solids are retained in the form of a cake.

Among the objects of this invention are to provide novel filtering apparatus; to provide a pressure filter which may be operated for a greater portion of the time; to provide such a filter in which the cake produced is effectively and adequately removed from the shell or casing thereof; to provide a pressure filter in which a maximum amount of divided solids is removed from the pulp; to provide novel discharge means, particularly adapted for use in a pressure filter; to provide a novel construction for the filtering elements of a pressure filter; to provide such a filter by which inspection and repair of the operating parts is greatly facilitated; to provide a novel support for the filtering elements, which is extensible axially for inspection or other purposes; to provide such a support in which adequate seals and bearings are provided; to provide a supporting shaft which acts also as a conductor of filtrate from and pressure influences to the filter elements; to provide a novel filter disk for a pressure type filter; to provide novel filter elements which include sectors and a novel filter cloth or bag shape, particularly useful in conjunction with such sectors; and to provide numerous other features, having advantages both in construction and in operation, as will be apparent from the description which follows, taken in connection with the accompanying drawings, in which:

Figure 1:
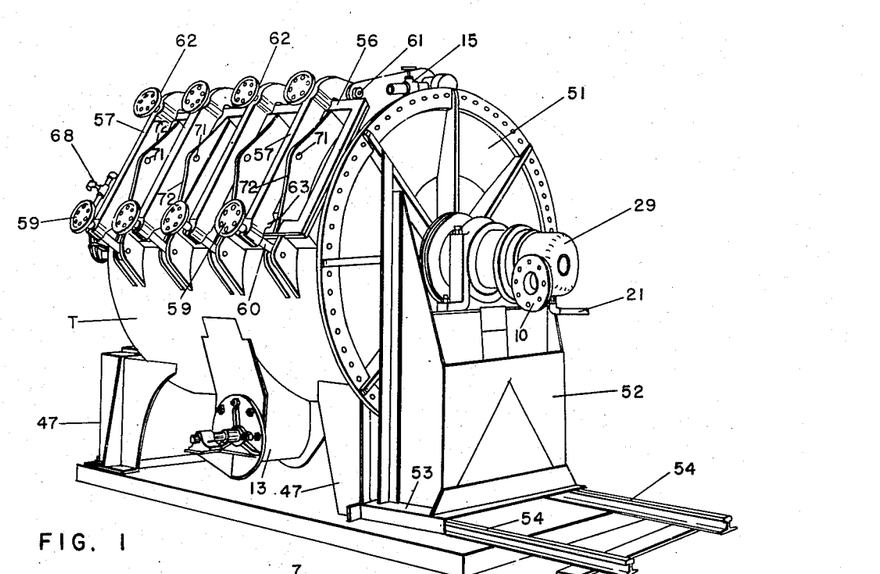
Fig. 1 is a perspective view of a filter constructed in accordance with this invention, looking at the valve end thereof.
Figure 2:
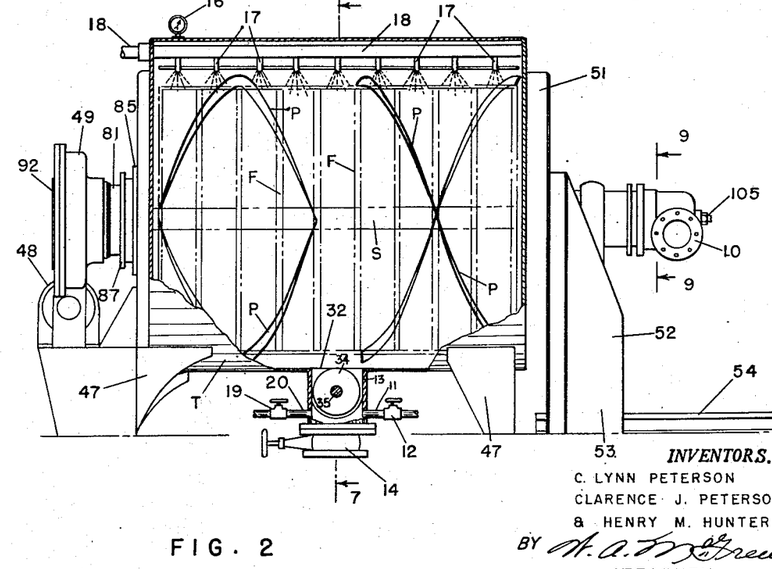
Fig. 2 is a side elevation of the filter of Fig. 1, partly in longitudinal section to show the interior construction.

As shown in Figs. 1 and 2, a pressure filter constructed in accordance with this invention may comprise a cylindrical tank T housing a plurality of filtering elements F, the tank T being closed and adapted to be completely filled with pulp under a pressure, in the more usual case from 20 to 70 pounds/square inch, but which may be higher, such as 200 pounds/square inch. The filtering elements F are mounted on a double shaft S, described in detail later, and may be in the shape of disks, each being provided with one or more filter cloths or the like, through which the filtrate is forced due to the pressure of pulp in the tank. In general, the filtrate is forced through the filter medium and passes through the shaft S to a filtrate discharge 10, and the pulp is introduced through a pulp feed line 11 by opening a valve 12. Pulp feed line 11 connects with a cake discharge housing 13, above a cake outlet valve 14, the latter being closed during filtration or building up of the cake of divided solids on the filter elements F. At the beginning of operation, the pulp is fed into tank T through pulp feed line 11, supplied by centrifugal pumps or other suitable pressure producing apparatus, while air in the tank is vented, as through a vent valve 15, the latter being closed as soon as the tank is full of pulp, or the pressure on a gage 16 reaches a predetermined value.

After a sufficient thickness of cake (such as two inches, more or less) has been deposited on the filter elements, so that the pressure within the tank T no longer tends to force a desired amount of filtrate through the cake, as determined by the flow of filtrate from discharge 10, the pulp feed line valve 12 is shut off, and displacement liquid, such as water, sprayed onto the cake from nozzles 17 supplied by a header 18, to effect displacement of filtrate in the cake by the liquid. Thereafter, or simultaneously therewith, a valve 19 controlling a bleed pipe 20 is opened to drain the remaining pulp from the tank, bleed pipe 20 connecting with housing 13 opposite pulp feed line 11. At the same time, through pressure connection 21, air, or $CO_2$ or other gas which will not support combustion when a combustible pulp or filtrate is present, may be introduced to cause the displacement liquid to be driven from the cake, while a substantial pressure still remains in the tank. Thereafter, upon a reduction in the pressure in the tank to a sufficiently low value, such as at or nearly atmospheric, as the pulp in the tank is drained through bleed pipe 20, the cake will tend to drop off into the tank. The rotation of the filter elements is continued during such operation, and in the event that any cake tends to remain on the filter elements, or to insure removal thereof, air, or $CO_2$ or other gas, may be introduced through a valve 22, shown in Figs. 9, 10 and 12 and described in greater detail later, which introduces gas into only the lowermost filter elements F. This effects a substantially complete discharge of the cake from each of the filter elements. If desired, a timed cycle may be utilized, the wash or liquid displacement spray from nozzles 18 being turned on for a predetermined period of time, and the reverse pressure of air or $CO_2$ or other gas, turned on for another predetermined period of time, such periods of time being determined for optimum economical effect for any particular type of pulp being treated.

When the filtrate is the desired product to be recovered, and a wet cake is of no consequence, water or steam may be utilized as the pressure medium. The pressure medium may be introduced to the valve end of the apparatus through pressure connection 21, or through any other suitable construction or piping arrangement, such as that shown in Fig. 8, wherein a header 24 is adapted to supply steam, air, $CO_2$ or other gas, while a header 25 is adapted to supply water or other liquid. Headers 24 and 25 lead to a three-way valve 26, which may be turned to an off position, or to either of the two on positions, for supplying steam or gas or liquid. Three-way valve 26 is connected to a second three-way valve 27, by which the fluid may be supplied either to a pipe 28, which leads to the valve end to supply fluid under pressure to all portions of the filter elements, except those connected to a second pipe 30, or to the second pipe 30 which also leads from three-way valve 27 and supplies fluid under pressure only to the lowermost portions of the filter elements, for final discharge of the cake or insurance of the same.

The discharge cake tends, of course, to fall toward the bottom of the tank where it is moved by plows P of Fig. 2 from each end toward the center of the tank. These plows P, constituting in effect a peripheral scroll, are an important feature of this invention, and are mounted peripherally with respect to filter elements F, rotating with the same. As will be observed from Fig. 2, the plows are left hand and right hand at the respective sides of the lateral center line of the tank, and thus are adapted to move the cake toward the center of the tank from each end. It will be understood, of course, that the plows P may be arranged so as to move the cake toward discharge at any other desired position, such as one end or the other of the tank T, although the central discharge position is preferred.

Figures 6, 7:
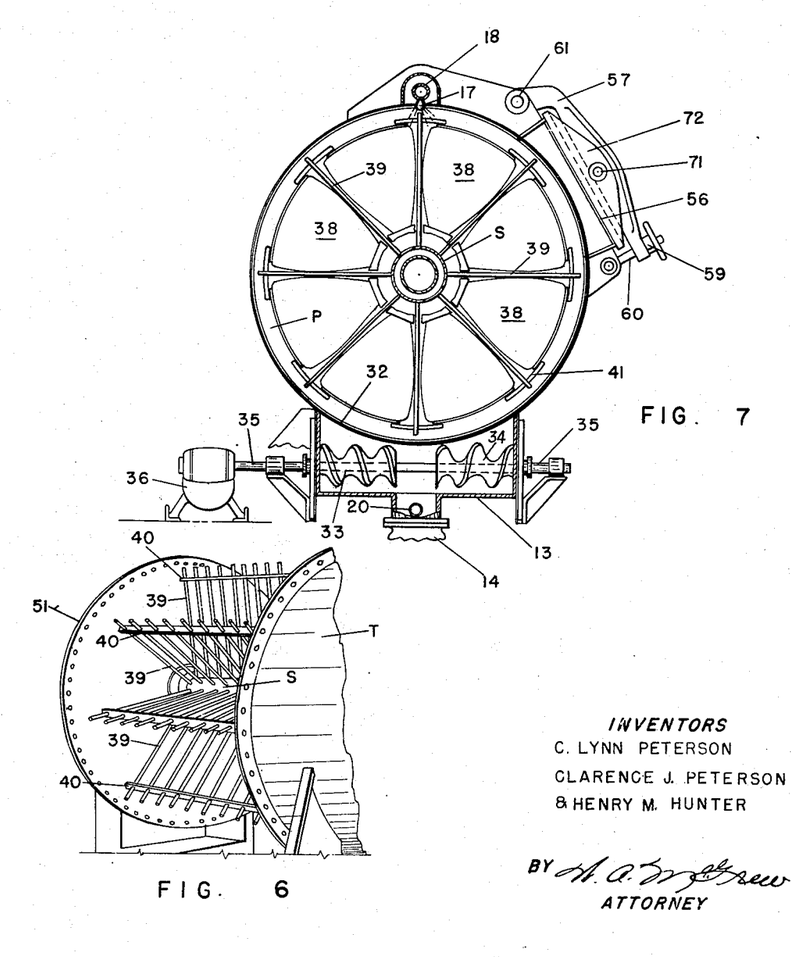
Fig. 6 is a perspective view of a sector attachment framework, in open or extended position, similar to the position of Fig. 3.
Fig. 7 is a lateral vertical section of the apparatus of Fig. 1, taken along line 7—7 of Fig. 2.

As evident from Figs. 2 and 7, when the cake is moved to the center of the tank T, it will fall through an opening 32 in the bottom of tank T into cake discharge housing 13, in which opposite handed scrolls 33 and 34 are mounted for rotation on a shaft 35, driven by a motor 36. The scrolls 33 and 34 terminate short of the longitudinal center line of the tank so as to obviate interference with plows P, and further since it is necessary only to move the cake to the opening leading to cake discharge valve 14, the latter, of course, having been opened. A particular advantage of the plows P lies in the fact that a substantially complete discharge of the cake can be made in a comparatively short period of time, without the necessity for cleaning or other operations inside the tank, which would normally be required to be done by hand. Thus, the next filtering operation can proceed quickly as soon as the cake is discharged from the previous operation, and considerable time is thereby gained, all of such gain in time being credited to the filtering operation time. Thus, after the cake has been discharged in the above manner, the valve 14 may be closed, and pulp feed valve 12 opened, to fill again the tank with pulp, for repetition of the filtering operation.

It will be understood of course, that scrolls 33 and 34 may extend longitudinally of the tank, instead of transversely, as shown, and also that the cake discharge outlet may be at one end of the tank, or in any intermediate position.

The filter elements F, as evident from Figs. 3 and 7, may comprise disks formed by individual sectors 38, eight sectors to a disk with each sector connected to a longitudinal passage within shaft S, in a manner explained later. Referring now to Fig. 6, the sectors are mounted on a framework consisting of a plurality of rods 39 extending radially from shaft S and connected together in rows adjacent their outer ends by longitudinal bars 40. As in Fig. 3, the disk sectors 38 are secured in position by clamps 41, (Fig. 14) which are secured to rods 39 by suitable nuts or the like and bear inwardly against the sectors 38, while the plows P are attached to bars 40, between the filter elements. Thus, any sector may be removed and/or replaced without removing the adjacent plows.

Figure 3:
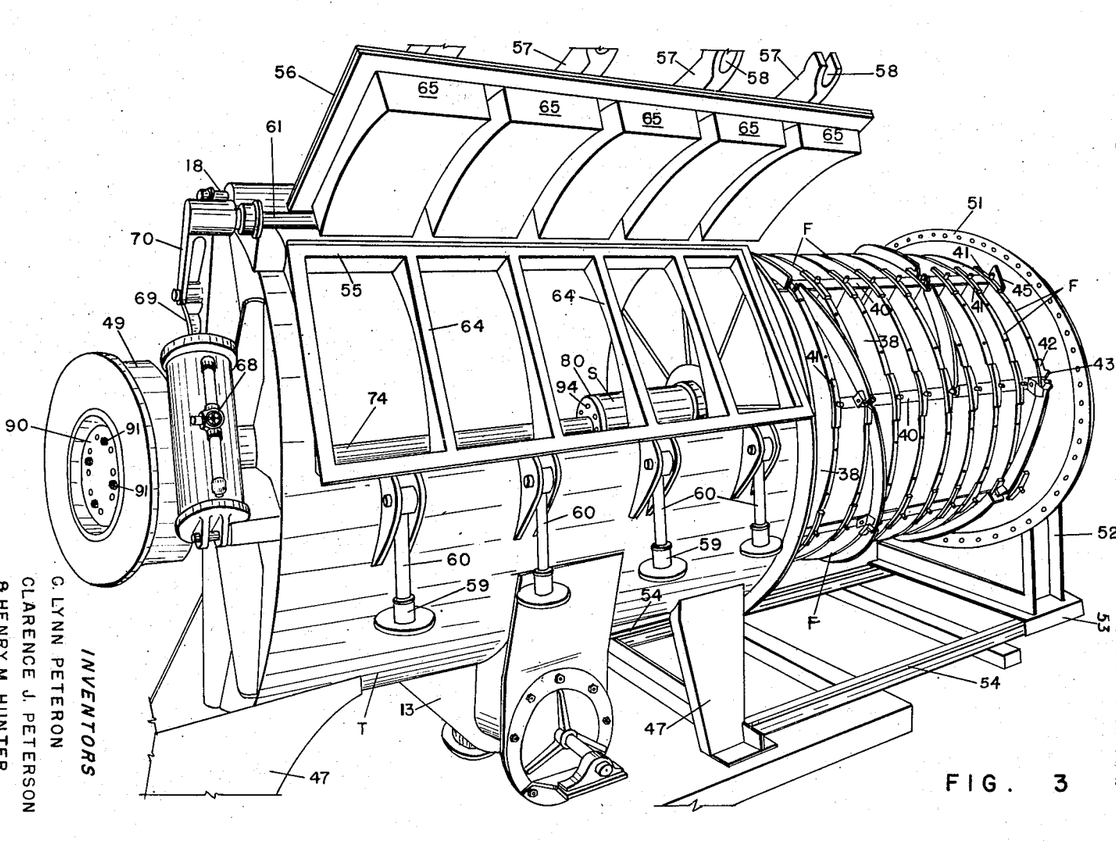
Fig. 3 is a perspective view, taken from the drive end of the filter of Fig. 1, but with an inspection door open and certain interior parts in an extended position, as for cleaning, inspection or repair purposes.
Figure 4:
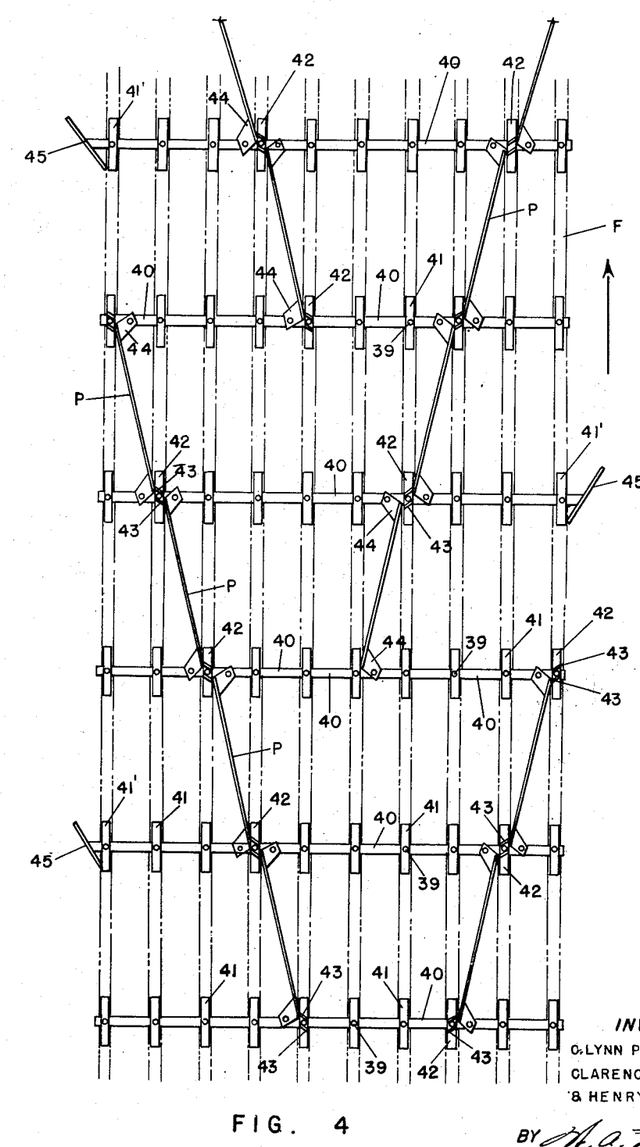
Fig. 4 is a diagram illustrating the position of certain plows or scrolls and associated parts of the apparatus of Fig. 1.
Figure 5:
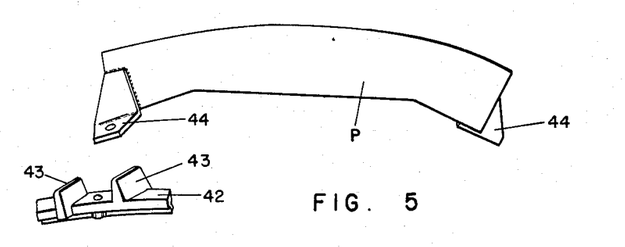
Fig. 5 is an exploded perspective view of a single plow and a cooperating sector attachment clamp.

A representative positioning of plows P is illustrated in Fig. 4, which is a projected peripheral diagram, showing only plows P, filter elements F in outline, bars 40, sector clamps 41, and the ends of rods 39, and also special clamps 42 which, as shown also in Fig. 5, are each provided with a pair of outwardly extending flanges 43, but are otherwise similar to sector clamps 41. As will be evident from Fig. 4, the plows are preferably so positioned that upon rotation in the direction of the arrow of Fig. 4, there will be at least two sets of plows to move the cake from each end of the tank inwardly or centrally by a continuous movement. Thus, each plow P, in extending from one bar 40 to the next bar, is disposed at a slight angle to the direction of movement, but the plows are mounted in series so as to provide, together with the flanges 43 of special clamps 42, a continuous scroll from the end of the rotor to a position adjacent the center. As in Fig. 5, the plows P are provided with lugs 44 to permit attachment to bars 40, while, as indicated previously, the gap between adjacent plows, at the filter elements F, is covered by the extending flanges 43 of the special clamps 42. To remove any sector, it is necessary only to remove the clamps 41 and/or 42 at the opposite ends, without disturbing the position of the adjacent plows P. In order to insure that the cake will be removed from the ends of tank T, end blades 45 may be attached, at two or more peripheral positions adjacent the ends of the tank, to sector clamps 41', as in Figs. 3 and 4.

Referring now to Figs. 1 to 3, the tank T may be mounted on legs 47 and the shaft S rotated from a motor 48 connected through suitable gearing, described later, in a housing 49. The "drive" end 50 of tank T is normally closed and supports an axial tube 74 on which the shaft S is mounted, but the "valve" end 51 is removable, for axial movement to the extended position of Fig. 3, along with a supporting bearing standard 52, which is provided with flanges 53, for movement along track rails 54. As will be evident from Fig. 3, in this open or extended position, the various parts of the filter elements F, as well as the interior of tank T through an inspection opening 55 when an inspection door 56 is open, are readily accessible for inspection, repair or cleaning purposes, and are supported by standard 52 and tube 74.

As in Figs. 1 and 3, inspection door 56 is provided with brackets 72 pivotally secured by pins 71 to yokes 57 each having slots 58 at their outer ends, to accommodate hand wheel operated clamping nuts 59, threaded onto hinged clamping bolts 60. Yokes 57 are affixed at their upper ends to a shaft 61, shown more clearly in Fig. 3, while hand wheel operated clamping screws 62, which threadedly project through yokes 57 adjacent the shaft 61 and bear when tightened against door 56 along the upper edge, and yokes 57 are provided with abutments 63 adapted to press downwardly against the door 56 along its lower edge, to insure a tight seal. Reinforcing ribs 64 may be provided, extending across inspection opening 55, and door 56 may be provided with blocks 65 adapted to fit between ribs 64 when the door is in closed position, the undersurface of both ribs 64 and blocks 65 being curved to conform to the cylindrical interior of tank T.

When access to inspection opening 55 of tank T is to be obtained, as in Fig. 3, the clamping bolts 60 are loosened and dropped to the position of Fig. 3. After upper clamping screws 62 have been loosened, hydraulic fluid under pressure is introduced into a cylinder 66, pivoted at its lower end on a bracket 67 and controlled by a valve 68 of Figs. 1 and 3, to move a piston rod 69 into the cylinder. To control the opening and closing of door 56, a link 70 is mounted on shaft 61 and also pivotally attached to the end of piston rod 69, to cause shaft 61 to turn, and thereby cause yokes 57, by means of pins 71, as in Figs. 1 and 7, attaching the yokes to brackets 72 extending outwardly from door 56, to move the door to the open position of Fig. 3. Movement of piston rod 69 in the opposite direction will, of course, close door 56.

A further valuable feature of this invention is the shaft S, which is movable axially, as in Fig. 3, along an inner supporting rod 74, which may be tubular. The shaft S, as in Figs. 9, 11 and 12, includes an inner pipe or tube 75 and an outer pipe or tube 76, separated by longitudinally extending and radially positioned strips or plates 77. In constructing the shaft S, the strips 77 may be welded to the inner tube 75, and the "star" assembly thus produced shrunk, as by means of a cold chamber, so that the assembly may readily be inserted within the outer tube 76. As soon as the "star" assembly heats up, of course, the strips 77 will expand against the inside of outer tube 76, thus forming a tight fit. Such construction not only provides a structure which is strong in comparison with its weight, thus reducing deflection at the center, but also provides longitudinal passages 78 between the strips 77, which passages are utilized for the removal of filtrate, and also the introduction of air, $CO_2$ or other gas or liquid under pressure to the filter elements F. As in Fig. 11, an annular plate 79, adapted to close off passages 78 at the drive end, may be welded to inner tube 75 at the same time that strips 77 are welded thereto, and also cold shrunk with the same, thereby producing a tight fit. In addition, an end ring 80 is welded to the inner tube 75 and outer tube 76 after assembly, in order to complete the structure at the drive end. It will be understood, of course, that other methods of assembly, such as including a press fit by assembly in a press, after manufacture to sufficiently close tolerances, or heating of outer tube 76 for insertion of the star assembly therein, may be utilized.

Figures 11, 12:
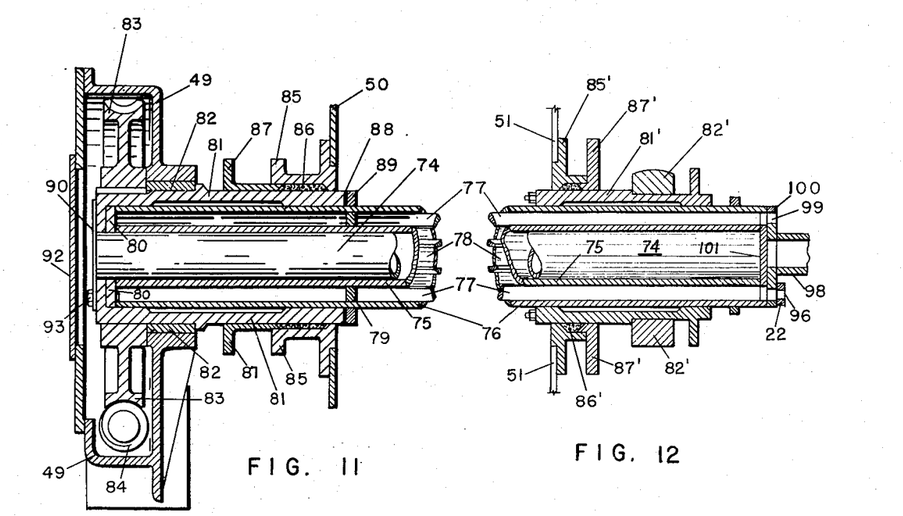
Fig. 11 is a fragmentary longitudinal section, taken at the drive end of the shaft.
Fig. 12 is a similar section, taken at the valve end of the shaft, illustrating an alternative valve end construction.

In further accordance with this invention, as in Fig. 11, a wear sleeve or trunnion 81 rotates within a bearing 82 in housing 49, a worm gear 83 being keyed to the end of trunnion 81 and engaged by a worm 84, driven by motor 48 of Fig. 2. An important advantage of trunnion 81 is that a stuffing box 85 may be attached, as by welding, to end 50 of tank T, and packing 86 retained therein by a gland 87. Although trunnion 81 rotates within stuffing box 85, it will be evident that when shaft S is moved longitudinally to the open or extended position of Fig. 3, there is no relative longitudinal movement between trunnion 81 and stuffing box 85, so that the seal provided by packing 86 is not disturbed. For additional sealing purposes, a gasket 88 may be interposed at the inner end of trunnion 81 and a flange 89 therefor provided on outer tube 76 of shaft S, both the gasket 88 and the flange 89 moving with the shaft 76 during withdrawal.

To hold the supporting rod 74 more securely in position, and also to obviate the possibility of any tendency toward longitudinal movement with shaft S when the latter is moved to extended position, the end of rod 74 is provided with a flange 90 attached by cap screws 91 of Fig. 3, to trunnion 81. For moving the inner structure to the extended position of Fig. 3, it is necessary only to remove a cover plate 92 and cap screws 93 of Fig. 11, the cap screws 93 extending, of course, through flange 90 of rod 74 and normally engaging threaded holes 94 of end ring 80, shown in Fig. 3. It is not necessary to remove cap screws 91 for rod 74.

At the valve end of shaft S, as in Fig. 12, a similar wear sleeve or trunnion 81', may be provided, rotating in bearing 82' mounted in standard 52, while a stuffing box 85', gland 87' and packing 86' may also be provided. As will be evident, the seal obtained thereby is not disturbed by longitudinal movement of shaft S.

Figures 8, 9:
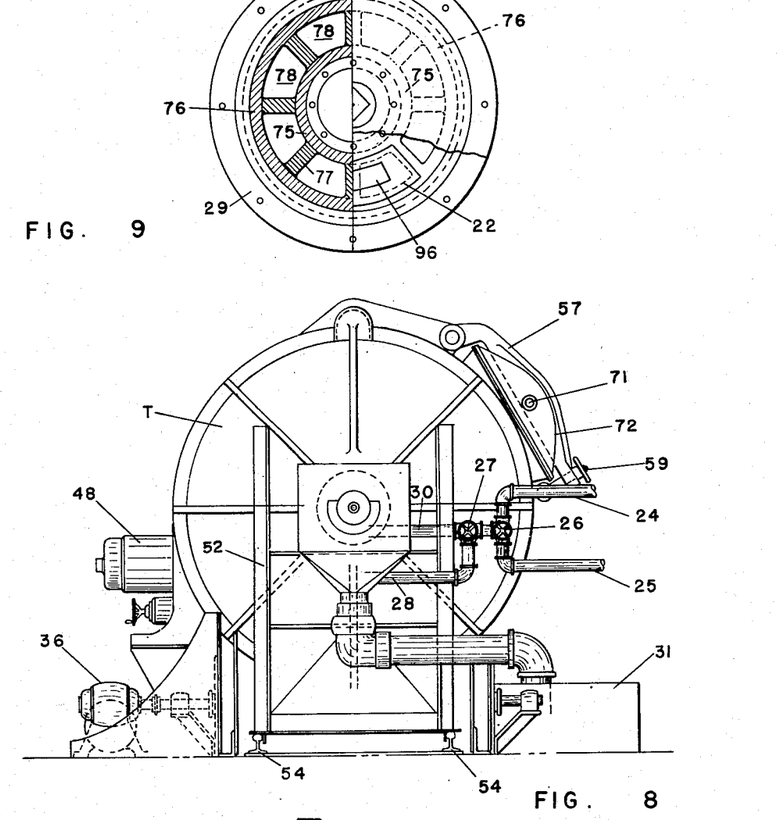
Fig. 8 is an end elevation of apparatus including generally the construction of Fig. 1, but with modification at the valve end.
Fig. 9 is an end view, partly in vertical section along line 9—9 of Fig. 2, and partly in full, but with a portion of a cover or housing removed to show a valve assembly.
Figure 10:
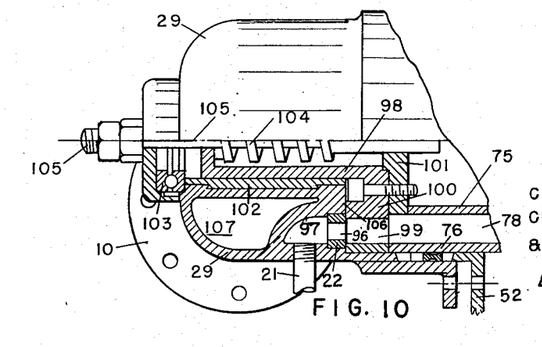
Fig. 10 is a partial longitudinal section of the valve assembly of Fig. 9.

At the valve end of shaft S, strips 77 form ports by which $CO_2$ or the like may be introduced to selected sectors, as through valve 22, as in Figs. 9 and 10, having a slot 96 covering only the area of one port or passage 78, and connecting, through a passage 97 in housing 29, with pressure connection 21. Housing 29 does not rotate with shaft S, being attached to bearing standard 52, but a cylinder 98 having ports 99 in a flange 100, is attached as by bolts to an end plate 101 extending only to and also welded to the inner tube 75 of shaft S, thereby leaving passages 78 open. A sleeve bearing 102 between housing 29 and cylinder 98, and a roller bearing 103 at the end of the housing, permit rotation of shaft S relative to the housing, while a spring 104, compressed by a clamping bolt 105, presses valve 22 and sealing surfaces 106 of housing 29 against flange 100. Only a relatively small amount of sealing between housing 29 and the end of shaft S is necessary, since there is atmospheric pressure in passage 107, which extends around the inside of housing 29 and communicates with the discharge 10, being interrupted only by the material forming pressure passage 97.

In operation, the door 56 is closed by manipulation of the valve 68, which actuates the link 70 on the shaft 61. Shafts 60 are then swung upwardly to engage the yokes, and wheels 59 are tightened to draw the lower edge of the door 56 into engagement with the filter. Threaded members 62 are also tightened to force the upper edge of the door into sealing relationship with the filter. Valve 12 is opened permitting the pulp to enter the filter through feed line 11, the filter elements being rotated by the gear 84 about the tube 74. The pressure exerted on the pulp forces the liquid portion through the filter elements 110 and through the screens 117 into the nipples 128 which communicate with the passages 78 disposed longitudinally about the tube 74. These passages communicate with the opening 107 in the housing 29, which in turn communicates with the discharge member 10.

When the solids disposed on the filter elements 110 have built up to the desired degree, the flow of pulp through the feed pipe 11 may be stopped and the valve 19 opened to discharge the liquid from the filter. Simultaneously therewith water from header 18 may be sprayed through the nozzle 17 to assist in dislodging the cake on the filter elements 110. Air, $CO_2$, or other gas may be introduced from the pipe 21 through the valve 22 into the passages 78 and thus into the sectors to assist in this action. It will be understood that the valve 22 is preferably disposed within the lower portion of the housing 29 and communicates with one, or at the most two, of the passages 78 at any one time. As a result the pressure of the gas is communicated to only the filter sectors which communicate with the particular channel or passage 78 which is at that moment in registry with the valve 22, these preferably being the lower sectors. Since rotation of the filter is continued during this operation, the plows P force the cake towards the opposed discharge conveyors 3 which are rotated by motor 36 and discharge the cake through the valve 14, which is opened for this purpose.

Figure 13:
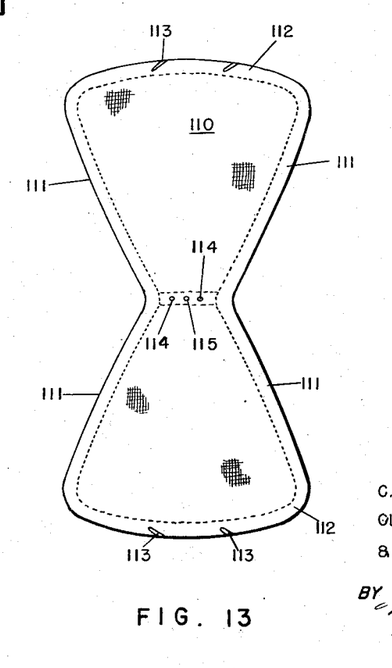
Fig. 13 is a plan view of a filter cloth, in open position prior to assembly.
Figures 14, 15, 16:
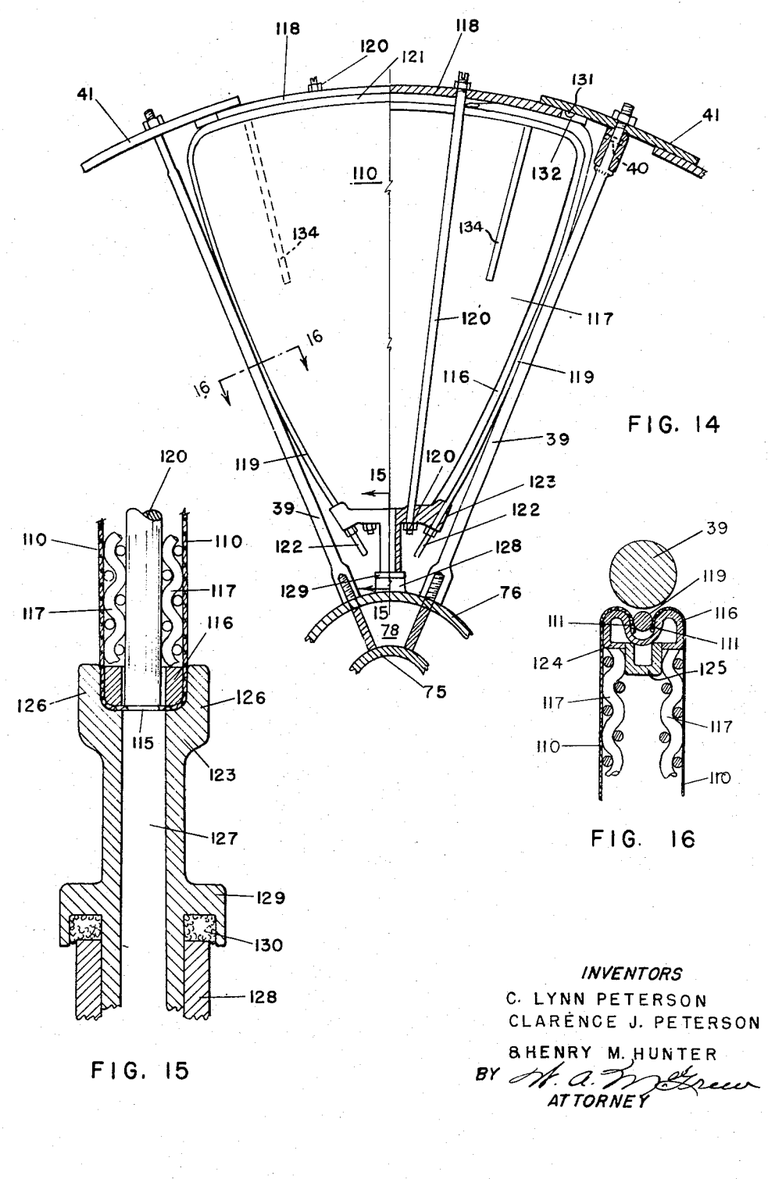
Fig. 14 is an end view of one type of filter disk sector, and certain associated parts, the sector including the filter cloth of Fig. 13 and being shown as mounted in the apparatus.
Fig. 15 is an enlarged vertical lateral section taken along line 15—15 of Fig. 14.
Fig. 16 is an enlarged oblique section taken along line 16—16 of Fig. 14.

Various types of sector construction may be utilized, such as that in Figs. 14 to 16, inclusive, in which a filter cloth 110 of Fig. 13 is utilized. Filter cloth 110 is formed generally in the shape of a dual sector, to provide a filtering medium for each side of a sector. Both the side edges 111 and end edges 112 of filter cloth 110 are convex, being arcuate in shape, while the end edges 112 are provided with tie rod slots 113 and the center with tie rod holes 114 and a drain hole 115. The filter cloth 110 is adapted to be mounted on a framework, as in Figs. 14 to 16, which includes a bar 116, on which in turn is mounted as for example by welding a pair of spaced, sector shaped screens 117, formed of wire mesh or the like suitable to form a support for the cloth. The screens are retained apart to provide space therebetween by means of tie rods 120 and screen support spacers 134. Bar 116 corresponds in shape to one half of cloth 110, which is sealed around its edges to the bar, at the top or ends by a curved clamping bar 118 and along the sides by cables 119. The convex edges 111 of cloth 110 and sides of bar 116 insure that inward pressure will be exerted at all points by cables 119, which may be flattened and welded at their upper ends to clamping bar 118, adjacent each tie rod 120, by which bar 118 is clamped in position and which extend through slots 113 and holes 114 in cloth 110. A short section of cable or spacing bar 121 may be attached to clamping bar 118, between the tie rods 120, and each cable 119 is provided at its lower end with a stud 122 which extends through a sector drain connection 123, through which tie rods 120 also extend. By means of nuts on studs 122 and tie rods 120, as shown, a continuous pressure may be exerted inwardly against all edges of the filter cloth 110, so as to hold the edges of the filter cloth securely against the bar 116. It will be understood, of course, that such construction eliminates the necessity for sewing the edges of a bag to be slipped over the bar, and it is therefore necessary to exert pressure inwardly against the bag at all peripheral points, as indicated above, the arcuate shape of the edges of the cloth and the bar permitting this to be accomplished.

In order that the unsewn edges of the bag will be held more securely thereagainst, the bar 116, as in Fig. 16, may be formed with a peripheral groove or trough 124, into which the side edges 111 of the filter cloth extend, so as to be wedged therein by cables 119. Also, an inwardly extending box or U-frame 125 may be formed integrally with bar 116, or attached thereto in any suitable manner, as by welding, in order to insure accurate spacing of screens 117, which may also be welded thereto and/or bar 116.

At its lower end, bar 116 is shaped to provide a flat surface which is adapted to be received in a trough formed, as in Fig. 15, by flanges 126 of drain connection 123, so that the bag will be clamped securely against the drain connection. This clamping avoids the necessity for forming a neck at the inner end of the bag, and fastening the neck to an outlet, as well as permitting a thinner sector to be utilized, thereby reducing overall length or increasing the number of disks which may be placed in a given length. Drain hole 115 in cloth 110 coincides with a passage 127 provided in drain connection 123, so that filtrate forced through the cloth and screens into the interior of the sector, i. e., the space between screens 117, will pass through the drain connection and thence into a nipple 128 mounted on the outer tube 76 of shaft S, and connecting with one of the passages 78 of Fig. 9. The drain connection 123 may also be provided with a boss 129 adapted to engage the outer end of nipple 128, and a gasket 130 is preferably provided in order to insure a tight seal. As will be evident, each sector may be made up as a unit, with cables 119 and tie rods 120 tightened, thereby clamping the cloth securely.

In installing a new sector, or replacing a sector whose cloth has become worn with another sector provided with a new cloth, it is necessary only to remove sector clamps 41 or 42, which are provided with lugs 131 adapted to engage slots 132 in clamping bars 118, to insure greater stability of the assembled structure. After removal of clamps 41 or 42, the sector to be replaced is readily removed with bar 118 attached thereto and the new, or newly equipped, sector inserted in position with the drain connection 123 engaging nipple 128, with gasket 130 therebetween. The sector clamps 41 and/or 42 are then replaced, and the new sector is ready for use. As explained previously, the replacement of a sector does not require any disturbance of plows P, so that a minimum of time for sector replacement is required.

Ordinarily, if only one or a few sectors are to be replaced, such operation may be conducted by merely opening inspection door 56. However, if a more extensive inspection, or additional operations are required, the movable or valve end 51 of the tank T may be unbolted and the entire inner structure moved out on rails 54, as to the position of Fig. 3, wherein access to and inspection of all of the interior parts is readily made.

Each nipple 128 is mounted by welding, or other suitable connection, on the outer tube 76 of shaft S, holes being drilled in outer tube 76 to lead to a longitudinal passage 78 at a point corresponding to each sector. Thus, when the pressure within the tank forces filtrate into the interior of the sector, the filtrate will pass into and through the respective longitudinal passage 78 for removal.

Figures 17, 18, 19:
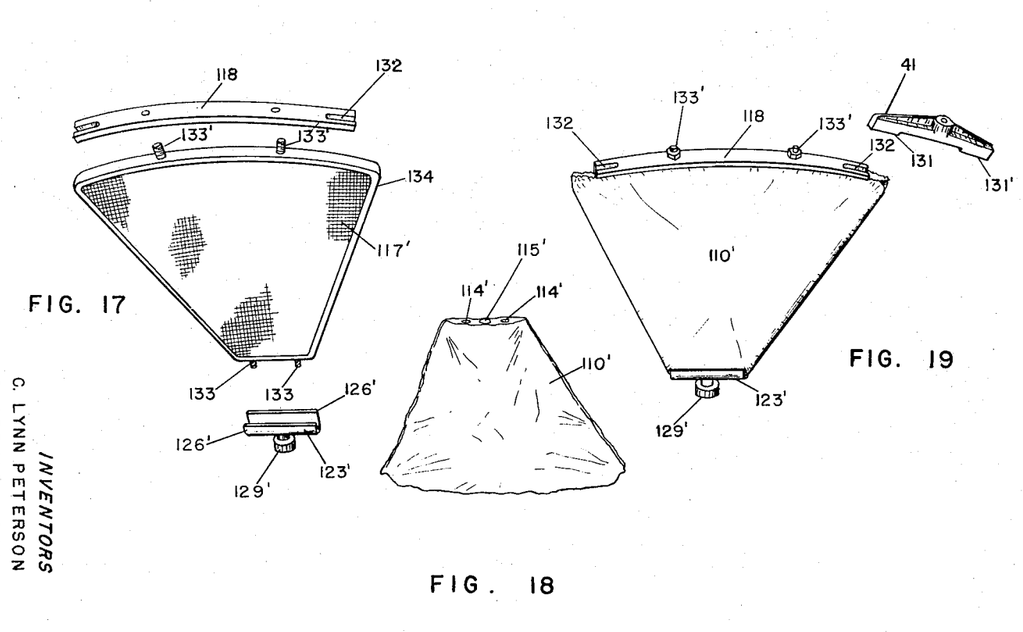
Fig. 17 is an exploded perspective view of the parts of the framework of an alternative sector construction.
Fig. 18 is a perspective view of a filter bag, adapted to be mounted on the framework of Fig. 17.
Fig. 19 is a perspective view of the assembled sector and an attaching clamp, prior to mounting in the apparatus.

When desired, alternative types of sectors may be utilized, such as illustrated in Figs. 17 to 19, inclusive. Such a sector may include a filtering cloth 110' of Fig. 18, which may generally have the shape of cloth 110 of Fig. 13, except that the side edges may be straight and sewn together to form a bag. The outer end of the bag is open, while stud holes 114' and a drain hole 115' are provided at the center, respectively, to accommodate studs 133 of Fig. 17 and provide a drain to a drain connection 123', provided with flanges 126' and a boss 129', for the purpose previously described. The filter cloth support comprises a bar 134, bent or otherwise formed to provide a segmental shaped outer rim. Screens 117' are welded, brazed, or otherwise secured around their edges to each side of bar 133, to provide an interior space, while studs 133' are mounted on the outer edge of bar 134, for attachment of a curved clamping bar 116', which clamps the outer ends of the bag against bar 134, thus forming a complete bag closure, as in Fig. 19. Also, sector clamp 41' may be formed in substantially the same manner as before, each lug 131 thereof being received in a slot 132 of a clamping bar 116'.

From the foregoing, it will be apparent that the method and apparatus of this invention fulfills to a marked degree the requirements and objects hereinbefore set forth. As will be evident, there are numerous features, all or only some of which may be incorporated in any specific apparatus, which provide various and sundry advantages. Thus, the double shaft S, which not only provides passages for removal of filtrate and transmission of reverse pressure to the filter elements, but also permits the entire inner structure to be moved endwise from the tank without disturbing the structure at the drive end, is of considerable value. Also, the wear trunnions by which a rotating seal is maintained without disturbance, even during lengthwise movement of shaft S, are of assistance in producing a more effective and economically operated filter. The placement of the peripheral plows P, preferably attached in a manner so as not to disturb access to or replacement of the filter sectors, insure quick and adequate removal of cake and thereby, as indicated previously, contribute materially to an increase in the per cent of total operating time. The individually removable disk sectors, both alone and in combination with the preferred plow construction, contribute considerably to the reduction of maintenance problems to a minimum. While any suitable sector construction may be utilized, the type wherein the supporting bar has slightly arcuate or convex sides, so that the edges of the filter bag may be tightly clamped at all points against the supporting bar, is of considerable advantage, since it eliminates the necessity for the often tedious and expensive operation of sewing the edges of the bags. Acting in cooperation with the plows P, for removal of cake, and also acting during the filtering operation to prevent any accumulation of the cake in the discharge outlet prior to the desired time of discharge, the cross scrolls further contribute to the effectiveness of operation and relative quickness of discharge of the cake.

Although one embodiment of this invention, together with variations in certain of the component parts, has been specifically illustrated and described or otherwise disclosed, it will be evident that other embodiments of this invention may exist, and that various changes may be made, not only in the construction of parts, but also in the utilization of the various features of this invention, both alone and in combination. Thus, numerous changes may be made without departing from the spirit and scope of this invention.

What is claimed is:

1. In a filter, a shell adapted to contain a pulp consisting of a liquid carrying divided solids; filtering means mounted for rotation within said shell and provided with a filtering medium for separating liquid from solids due to a difference in pressure across said filter medium; and inner and outer concentric shafts normally disposed within said shell, said filtering means being mounted on said outer shaft only for rotation and said outer shaft and filtering means being movable longitudinally along the inner shaft from said shell to an exterior position when access to said filtering means for inspection and repair purposes and the like, is desired, said inner shaft being constructed and arranged to remain in a stationary axial position upon such longitudinal movement of said outer shaft, and thereby support the inner end of said outer shaft during such longitudinal movement and exterior position.

2. In a filter, a shell adapted to contain a pulp consisting of a liquid carrying divided solids; filtering means mounted for rotation within said shell and provided with a filtering medium for separating liquid from solids due to a difference in pressure across said filter medium; inner and outer concentric shafts normally disposed within said shell for supporting said filtering means for rotation, one end of the inner shaft being fixed, said filtering means being mounted wholly on said outer shaft and said filtering means and outer shaft being movable longitudinally as a unit from said shell at one end thereof to an exterior position when access to said filtering means for inspection or repair purposes is desired, said inner shaft being constructed and arranged to remain in a stationary longitudinal position upon longitudinal movement of said outer shaft and filtering means and thereby supporting the inner end of said outer shaft; a bearing for said shafts at the fixed end of said inner shaft; and a wear ring received by said bearing and in turn receiving said outer shaft when the latter is in closed position, but remaining fixed longitudinally when said outer shaft is moved to exterior position.

3. In a filter, a shell adapted to contain a pulp consisting of a liquid carrying divided solids; filtering means mounted for rotation within said shell and provided with a filtering medium for separating liquid from solids due to a difference in pressure across said filter medium; inner and outer concentric shafts normally disposed within said shell, said filtering means being mounted on said outer shaft for rotation therewith and said outer shaft and filtering means being movable axially from said shell as a unit along the inner shaft to an exterior position when access to said filtering means for inspection or repair purposes and the like is desired, said inner shaft being constructed and arranged to remain stationary upon such longitudinal movement of said outer shaft and thereby support the inner end of said outer shaft; drive means for said shafts; and a detachable connection between said drive means and said outer shaft.

4. In a filter, a shell adapted to contain a pulp consisting of a liquid carrying divided solids; filtering means mounted for rotation within said shell and provided with a filtering medium for separating liquid from solids due to a difference in pressure across said filter medium; inner and outer concentric shafts normally disposed within said shell for supporting said filtering means for rotation, said filtering means being mounted on said outer shaft and said outer shaft and filtering means being movable axially as a unit along the inner shaft from a closed position within said shell to an exterior position outside said shell at one end thereof, said inner shaft being constructed and arranged to remain stationary upon longitudinal movement of said outer shaft and filtering means and thereby support the inner end of said outer shaft; and a movable standard for supporting the opposite end of said outer shaft.

5. In a filter, a shell adapted to contain a pulp consisting of a liquid carrying divided solids; a rotatable shaft within said shell including an inner tube, an outer tube and a radial series of strips extending longitudinally between the inner and outer tubes thereby forming a radial series of longitudinal passages between the tubes; said strips being secured to one of said tubes and slideably engaged with the other said tube whereby to maintain the passages separate on rotational movement between said tubes, and filtering means mounted for rotation upon said shaft and provided with a filtering medium for separating liquid from solids due to a difference in pressure across said filter medium, said filter medium having radially disposed conduits corresponding in position to the passages within said shaft and connected therewith.

6. In a filter, a cylindrical tank mounted in horizontal position and having a removable end; a support for said removable end and including a bearing; a track for said support, whereby said support and removable end may be moved longitudinally away from said tank; a shaft normally disposed within said tank and mounted at one end in said bearing, said shaft being movable longitudinally to an exterior position by movement of said tank end and support; filtering means mounted on said shaft; a longitudinally fixed rod disposed centrally within said shaft and adapted to support the opposite end of said shaft during such longitudinal movement; a normally fixed end for said tank opposite said removable end; a second bearing mounted exteriorly of but adjacent to the normally fixed end of said tank; a wear sleeve adapted to rotate within said second bearing, said wear sleeve surrounding the end of said shaft and being detachably connected to said shaft; drive means for rotating said shaft and connected to said wear sleeve; and a rotatable seal between said wear sleeve and the normally fixed end of said tank.

References Cited in the file of this patent

UNITED STATES PATENTS

| Number | Name | Date |
|---|---|---|
| 962,168 | Scholl | June 21, 1910 |
| 1,017,476 | Singer | Feb. 13, 1912 |
| 1,212,932 | Genter | Jan. 16, 1917 |
| 1,227,983 | Vallez | May 29, 1917 |
| 1,432,134 | Sweetland | Oct. 17, 1922 |
| 1,666,515 | Sweetland | Apr. 17, 1928 |
| 1,670,515 | Sweetland | May 22, 1928 |
| 1,887,798 | Bryant | Nov. 15, 1932 |
| 1,920,126 | Grovers | July 25, 1933 |
| 2,027,475 | Giraud | Jan. 14, 1936 |
| 2,207,618 | Grill et al. | July 9, 1940 |
| 2,255,205 | Chamouton | Sept. 9, 1941 |
| 2,338,549 | Shriver et al. | Jan. 4, 1944 |
| 2,510,254 | Richter | July 6, 1950 |